United States Patent [19]
Karasek

[11] Patent Number: 5,968,467
[45] Date of Patent: Oct. 19, 1999

[54] DIOXIN FORMATION PREVENTATIVE IN INCINERATORS AND METHOD FOR PREVENTING THE FORMATION OF DIOXINS

[75] Inventor: Francis W. Karasek, Sun Lakes, Ariz.

[73] Assignee: Kurita Water Industries, Co., Ltd., Japan

[21] Appl. No.: 08/715,344

[22] Filed: Sep. 18, 1996

Related U.S. Application Data

[60] Provisional application No. 60/004,168, Sep. 22, 1995.

[30] Foreign Application Priority Data

Feb. 16, 1996 [JP] Japan ................................ 8-028877

[51] Int. Cl.$^6$ ............................. A62D 3/00; B01D 53/02; B01D 53/70
[52] U.S. Cl. ...................... 423/240 S; 588/207; 110/345
[58] Field of Search .................... 588/207, 206; 423/240 S, 240 R; 110/345

[56] References Cited

U.S. PATENT DOCUMENTS 4,793,270  12/1988  Karasek ................................ 423/215.5
5,185,134   2/1993  Gullett ................................ 423/240 R
5,514,356   5/1996  Lerner ................................ 423/240 S

FOREIGN PATENT DOCUMENTS

| 0451133 | 10/1991 | European Pat. Off. . |
| 0455152 | 11/1991 | European Pat. Off. . |
| 0646405 | 4/1995 | European Pat. Off. . |
| 3-224618 | 3/1991 | Japan ................................ 423/240 R |
| 92-00136 | 1/1992 | WIPO ................................ 423/240 R |
| WO9200794 | 1/1992 | WIPO . |
| 92-19365 | 11/1992 | WIPO ................................ 423/240 S |
| WO9518667 | 7/1995 | WIPO . |

*Primary Examiner*—Steven Bos
*Assistant Examiner*—Peter DiMauro
*Attorney, Agent, or Firm*—Morrison Law Firm

[57] ABSTRACT

A dioxin preventative includes an adsorbent that sorptively removes dioxin precursors from an exhaust gas stream of an incinerator at a point prior to the exhaust gas stream cooling to below a temperature of 400° C. The dioxin preventative includes a covering agent which coats flyash.

16 Claims, 2 Drawing Sheets

DIOXIN FORMATION PREVENTATIVE IN INCINERATORS AND METHOD FOR PREVENTING THE FORMATION OF DIOXINS

This is a provision application Ser. No. 60/004,168 filed Sep. 22, 1995.

BACKGROUND OF THE INVENTION

The present invention relates to a material preventing the formation of organic chlorine compounds such as polychlorinated-p-dibenzodioxins (PCDD) and polychlorinated dibenzofurans (PCDF) (which will hereinafter be referred to as "dioxins" collectively) in an incinerator and also a method for preventing the formation of dioxins specifically. More specifically, the present invention relates to a method which makes possible to lower the dioxin concentration in an exhaust gas and in the flyash with certainty at a low cost. The present invention achieves such benefits not by using a large-scaled dioxin removing apparatus but by simply adding chemicals to the exhaust stream.

In an incinerator, a large amount of organic compounds and hydrocarbons ($C_nH_m$) are evolved. They are brought into contact with air, followed by decomposition into $CO_2$ gas and water. If they are not brought into contact with air well, dioxin precursors are generated.

Examples of the dioxin precursors include aromatic compounds such as phenol or benzene, chlorinated aromatic compounds such as chlorophenol or chlorobenzene, chlorinated alkyl compounds, etc.

The above-exemplified dioxin precursors become sorbed to the flyash particles. "Sorbed" means adsorbed or absorbed. The difference being one of scale and distance from a surface. There is no sharp boundary between adsorption and absorption. The chemical processes of interest in dioxin formation occurs near or on a surface. Accordingly, the terms "adsorb", "adsorbed", and "adsorption" are used herein but one of ordinary skill in the art understands the extent that absorption is included in the term adsorption for such processes.

As the dioxin precursors are sorbed to the flyash particles, by catalytic action of the active sites on the flyash, the precursors are converted to dioxins. The precursors do not easily become dioxins at high temperatures of 400° C. or higher even under the coexistence of the flyash. When the temperature lowers and becomes about 200°–400° C., however, a (catalytic) reaction as shown by the below formula, for example, occurs and these precursors convert into dioxins:

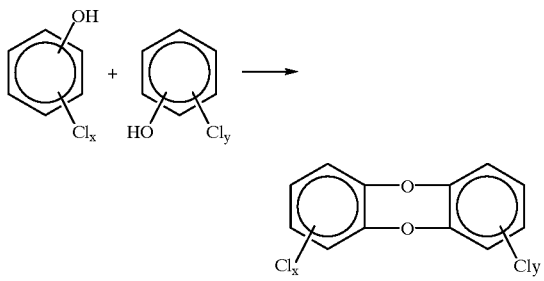

It is known as a method for removing the dioxins so formed, which are contained in an exhaust gas, before they are released to the environment, to inject activated carbon in the powdery form into a combustion exhaust gas line which is 120°–250° C. at the point before the dust collector, thereby having dioxins, which have been once formed on the flyashes in the exhaust gas treatment system, adsorbed on the activated carbon and removing them (Japanese Patent Kokai No. HEI 5-31323), incorporated by reference herein in its entirety.

The above method makes it possible to reduce the amount of dioxins in the exhaust gas, but is accompanied with the problem that the flyash contaminated with dioxins is produced. Furthermore, waste activated carbon on which dioxins have been adsorbed is generated so that another dioxin treatment becomes necessary for the disposal of the waste activated carbon.

OBJECTS AND SUMMARY OF THE INVENTION

An object of the present invention is to provide a novel method to correct the above-described problems effectively.

Described specifically, an object of the present invention is to provide a method to prevent the formation of dioxins in an incinerator by simply injecting thereinto preventative chemicals.

With a view to overcoming the defects of the above described dioxin controlling method and to attaining the above object, the present inventors have conducted an extensive investigation. As a result, it has been found that dioxin precursors, from which dioxins are formed, can be sorbed on an adsorbent and the dioxin precursors can be removed by injecting such a dioxin precursor adsorbent in an exhaust gas of an incinerator, thereby making it possible to reduce the dioxin concentration not only in the exhaust gas but also in the flyash.

Briefly stated, a dioxin preventative includes an adsorbent that sorptively removes dioxin precursors from an exhaust gas stream of an incinerator at a point prior to the exhaust gas stream cooling to below a temperature of 400° C. The dioxin preventative includes a covering agent which coats flyash.

According to an embodiment of the present invention, a dioxin formation preventative in an incinerator, the dioxin formation preventative comprises an adsorbent which adsorbs a dioxin precursor.

According to another embodiment of the present invention, a dioxin formation preventative in an incinerator having flyash in an exhaust gas stream, the dioxin formation preventative comprises a covering agent to coat the flyash, and an adsorbent to sorb a dioxin precursor.

According to another embodiment of the present invention, a dioxin formation preventative in an incinerator, the dioxin formation preventative comprises an adsorbent which adsorbs a dioxin precursor, and a covering agent, wherein the covering agent is applied to flyash.

According to another embodiment of the present invention, a method for preventing the formation of dioxins in an incinerator, the method comprises adding a dioxin precursor adsorbent into a volume of exhaust gas, wherein the volume of exhaust gas has a temperature above 400° C.

With a view to attaining the above objects, in accordance with the present invention, there is provided a material for preventing the formation of dioxins in an incinerator, which material comprises a dioxin precursor adsorbent which is more absorptive for precursors than two flyash particles and does not exhibit the catalytic behavior of flyash.

As a preferred example, at least one adsorbent selected from the group consisting of activated carbon, volcanic ash, silica-based compounds, clay minerals, phosphoric acid compounds, and carbonate-based compounds can be given to increase the relative adsorption of the injected material to that of the flyash, a surface of flyash coating material can be injected prior to injecting the adsorbents.

In another aspect of the present invention, there is provided a method to prevent the formation of dioxins in an incinerator, which comprises injecting a dioxin precursor adsorbent prior to a point, during an exhaust gas treating step, where a gas exhausted from the incinerator becomes less than 400° C.

According to the present invention, the formation of dioxins in an incinerator can be prevented with certainty at a low cost. In the prior art, dioxins are decomposed or removed after formation. In the present invention, on the other hand, the formation of dioxins is prevented by cutting off the formation mechanism, so that dioxins not only in an exhaust gas but also in the flyash can be reduced. The powdery activated carbon after adsorption does not contain dioxins so that the conventional treatment step of dioxins is not required and the adsorbent can be disposed of by reclamation or the like.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
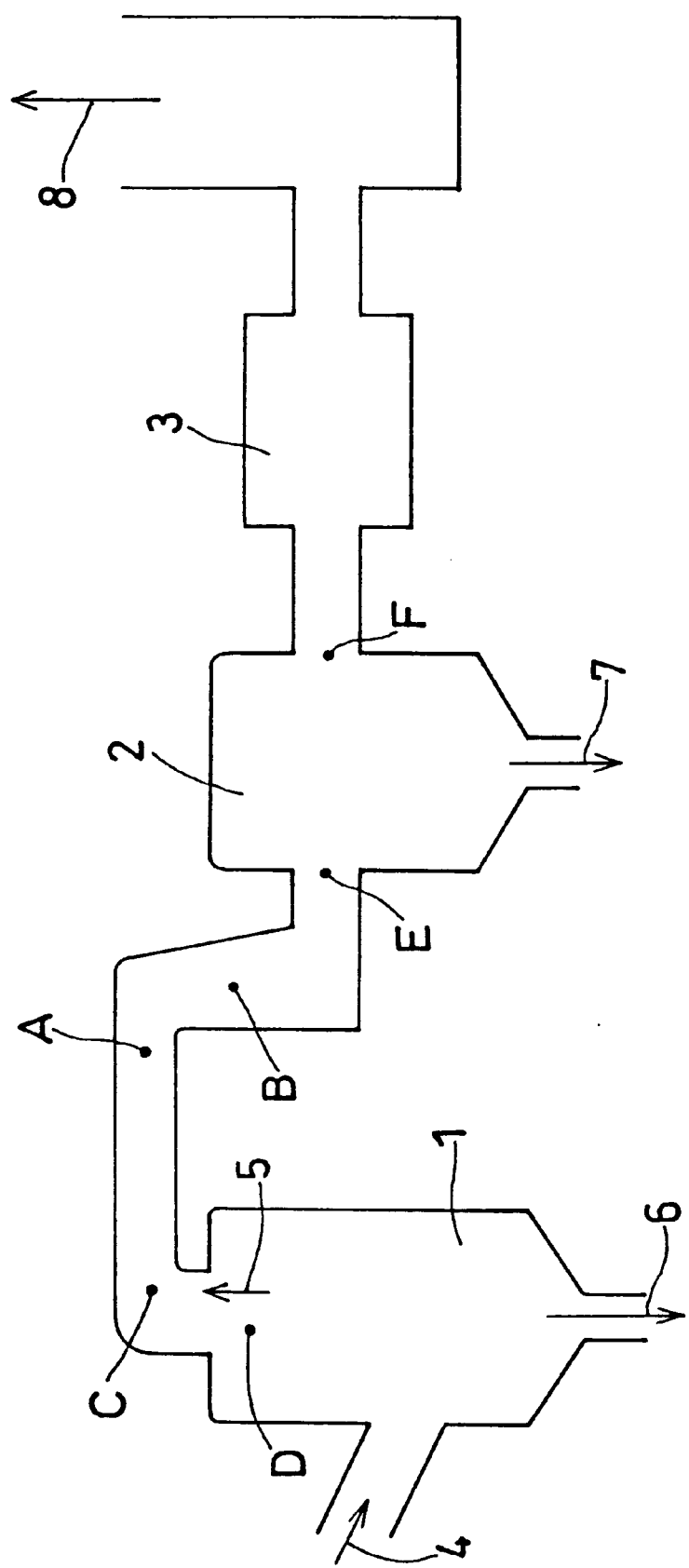
FIG. 1 is a schematic block diagram of an exhaust gas treating step embodying the present invention.

In the present invention, the formation of dioxins are prevented by a porous non-catalytic adsorbent which adsorbs dioxin precursors contained in an exhaust gas in an incinerator.

As such an adsorbent, a porous adsorbent is preferred. Specific examples include activated carbon such as coal based activated carbon, coconut based activated carbon, resin based activated carbon, wood based activated carbon or peat based activated carbon; volcanic ash; silica-based materials such as silica gel, Shirasu or Chromosorb (trade mark; Superco Inc.); clay minerals such as zeolite; phosphoric acid compounds such as granulated ammonium magnesium phosphate (which may hereinafter be abbreviated as "MAP"); and carbonic-acid-based compounds such as coral fossil or calcium carbonate.

Adsorbents used in this invention each has an average particle size which includes from several mm (100 mesh) down to a 500 mesh. Average particle sizes larger 100 mesh have reduced surface area for a given roughness and consequently have reduced effectiveness. Average particle sizes smaller than 500 mesh can be used although their handling can be a problem.

The adsorbents can be used either singly or in combination. Of these, activated carbon, silica gel, MAP, coral fossil, zeolite and volcanic ash are particularly preferred.

It is important that the adsorbent which is used for the removal of dioxin precursors from a combustion gas in an incinerator is stable at an introduction temperature and does not have catalytic activity for the acceleration of the formation of dioxins in a temperature range of from 200° C. to 400° C. Concerning three adsorbents out of the above-exemplified ones, their properties were tested. The inventors obtained the data at the University of Waterloo, Waterloo, Ontario, Canada. The data is described below.

(1) Catalytic activity test of activated charcoal and Chromosorb, dated Nov. 15, 1994.

(2) Catalytic activity test of volcanic ash using 13C6-pentachlorophenol, dated Apr. 3, 1995.

These data are shown in the following Table 1.

TABLE 1

| Adsorbent | Adsorption | Stability | Catalytic Activity |
| --- | --- | --- | --- |
| Chromosorb w. 80–100 mesh | Low | High | Inert to Moderate |
| Activated Charcoal, Darco, C-60, 100 mesh | High | Moderate to High | None |
| Volcanic Ash, Mt. St. Helens. WA | High | High | None |

From these results, it is clear that both the activated charcoal and volcanic ash would be suitable for a dioxin formation preventative.

It is desired to impregnate at least one alkaline substance such as NaOH, KOH, $Ca(OH)_2$, $NH_3$, or the like in an adsorbent in order to immobilize the precursors and also in order to further increase the effects of preventing the dioxin formation.

The adsorbent is added in an amount of 0.5–20 wt. % relative to the amount of the flyash, with 2–15 wt. % being more preferred. The alkaline substance is added in an amount of 0.1–10 wt. % relative to the amount of the adsorbent, with 1–6 wt. % being preferred.

In the present invention, the formation of dioxins is prevented by adding a dioxin precursor adsorbent in the exhaust gas treating step in an incinerator, thereby adsorbing and removing the dioxin precursors. The adsorbent can be added by any convenient means such as, for example, by injection.

The adsorbent is injected at a point, during the exhaust gas treating step, prior to where the temperature of the gas exhausted from the incinerator falls below 400° C. Described specifically, the point is where the temperature falls within a range of 400–1000° C., preferably 400–600° C. When the exhaust gas reaches the electrostatic precipitator or bag filter, or other flyash removing apparatus, its temperature falls to around 300° C. and dioxin precursors inevitably are converted to dioxins at the portions where the exhaust gas is brought into contact with the flyash.

It is advantageous to inject the adsorbent at multiple points to increase the effects of the adsorbent. The adsorbent so injected is separated from the exhaust gas by a dust separator.

The present invention can be applied not only to various municipal incinerators but also to incinerators such as industrial waste incinerators, medical waste incinerators and burned ash fusion furnaces.

The present invention can be applied to any incinerator whether it is an existing one or newly-installed one; or it can be applied any type of the incinerator whether it is a continuous furnace, semi-continuous furnace or batch furnace.

The present invention makes it possible to reduce a dioxin concentration not only in the exhaust gas but also in the flyash.

Referring to FIG. 1, which schematically illustrates an exhaust gas treating step according to the present invention, the treating apparatus in the treating step includes an incinerator 1, an electric dust collector 2, and a gas purifier 3.

An incineration charge 4 is burned in incinerator 1 and an exhaust gas 5 is sent to the subsequent treating step, while a bottom ash 6 is discharged. At a point D above the incinerator, the temperature is usually about 800–1000° C. At an inlet E and an outlet F of electric dust collector 2, the temperatures become about 350–200° C. and about 300–150° C., respectively.

The flyash 7 is removed by electric dust collector 2. The exhaust gas is discharged at a point 8 through gas purifier 3.

In the conventional apparatus, according to the reaction of the dioxin precursors adsorbed on the active portion of the flyash, dioxins are formed inside of electric dust collector 2 maintained at about 300° C. In the present invention, on the other hand, at the point(s) before electric dust collector 2, that is, at least one point including a point A, B, C or the like, the adsorbent is charged in the apparatus to adsorb dioxin precursors, thereby preventing the formation of dioxins. It is apparent that at each point, multiple charging means may be installed.

OTHER EMBODIMENTS OF THE PRESENT INVENTION

In the present invention, it is also possible to prevent the formation of dioxins with more certainty by using a covering agent for the flyash in combination as described below.

Examples of such a covering agent include aqueous solutions or suspensions of a water-soluble silicate such as potassium silicate or sodium silicate; a silicone-based polymer; amine compound; ammonium compound; ammonia and phosphoric acid compound; a complex of an organic or inorganic compound; and a water-soluble colorant.

The covering agent is added by spraying an aqueous solution or suspension of such a substance at the charging point A, B or C in FIG. 1. Above all, it is preferred to conduct the spraying, at a temperature range of from 500° C. to 800° C., sufficiently before the introduction of the adsorbent, because sufficient time is thus available for covering the flyash and making it inert to the adsorption of dioxin precursors.

A preventing mechanism of dioxin formation according to the present invention

The constitution of the present invention is presumed to bring about the following action. According to the studies by Karasek, *Science*, 237:754(1987), Stieglitz *Chemosphere*, 18:1219(1989), and Hutzinger *Chemosphere*, 14:581(1985), each incorporated herein by reference in its entirety, the formation of dioxins in the incinerator is caused by the conversion of the dioxin precursors contained mainly in the exhaust gas to dioxins by the catalytic action of the flyash. The optimum temperature for the reaction is about 300° C. and a metal such as iron or copper contained in the flyash is considered to participate in the catalytic reaction. Representative examples of the dioxin precursor include chlorinated hydrocarbon compounds such as chlorophenol and chlorobenzene. These compounds are said to be formed from $C_2H_2$, $CH_4$, $Cl_2$, HCl, or the like.

Figure 2:
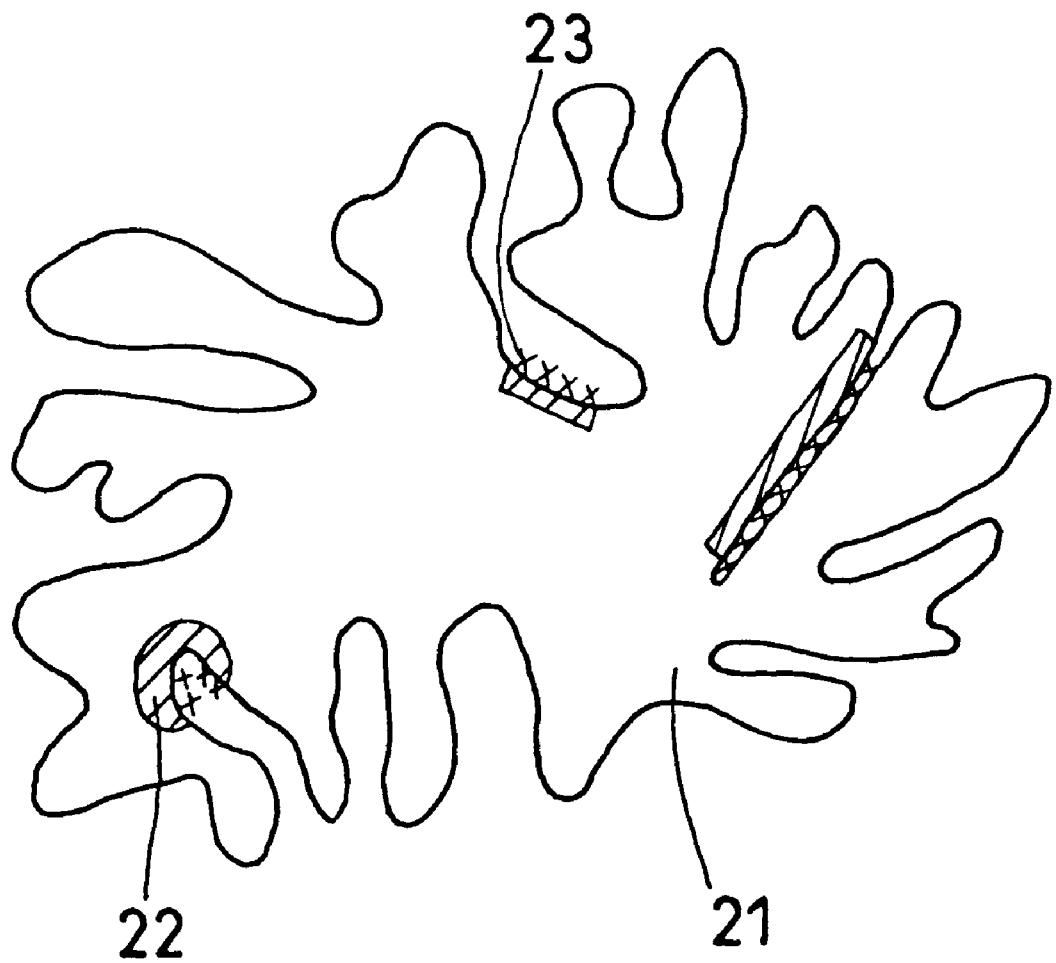
FIG. 2 is a schematic diagram illustrating catalytic action by the flyash.

Referring to FIG. 2, the state of the flyash and dioxin precursor is schematically illustrated. Described specifically, dioxin is formed by a dioxin precursor 23 adsorbed on an active portion (oblique lines) 22 of a flyash particle 21.

The adsorbent used in the present invention adsorbs and removes the precursor so that the precursor cannot reach the active portion on the surface of the flyash, whereby the formation of dioxins is prevented, The alkaline substance to be impregnated in the adsorbent also accelerates the absorption of an acid gas or chlorophenol.

EXAMPLE 1

A glass column was filled with 1 g of glass beads to which 100 μg of $^{13}C_6$-pentachlorophenol were attached, followed by filling with 1 g of stoker flyash, which had been washed with an acid and treated by Soxhlet extraction, with a sheet of glass wool interposed between the glass beads and the stoker flyash. The resulting column was heated at 300° C. for 20 minutes while air was blown at a flow rate of 5 ml/min. The dioxins formed on the filled materials were recovered by Soxhlet extraction, while the dioxins contained in the exhaust gas were collected by allowing the exhaust gas to pass through toluene in an ice-cooled impinger. After the dioxins so collected were combined and then concentrated, the resulting $^{13}C$-dioxins were determined by GC-MS (gas chromatography/mass spectroscopy). As a result, it became clear that 251 ng of $^{13}C$-dioxin were formed as shown in Table 2.

EXAMPLE 2

A glass column was filled successively with 1 g of glass beads to which 100 μg of $^{13}C_6$-pentachlorophenol were attached, 1 g of an adsorbent, and 1 g of stoker flyash subjected to acid washing and Soxhlet extraction treatment, with sheets of glass wool being interposed between adjacent two materials. The resulting column was heated at 300° C. for 20 minutes while air was blown at a flow rate of 5 ml/min. The dioxins so formed were collected in a similar manner to Example 1, followed by determination by GC-MS. As adsorbents, activated carbon, volcanic ash, zeolite, silica gel, apatite, coral fossil, granulated magnesium ammonium phosphate and bone black were employed. As a result, as shown in Table 2, the amount of $^{13}C$-dioxin so formed decreased to 12%–49% of that formed without the adsorbent.

TABLE 2

Effects of Adsorbent for the Prevention of Dioxin Formation

| Adsorbent | Particle Size | $^{13}C$-dioxin Formed (ng) |
|---|---|---|
| None | — | 251 |
| Activated Carbon | 110 mesh or smaller | 43 |
| Volcanic Ash | 110 mesh or smaller | 75 |
| zeolite | 0.5 mm | 107 |
| Silica gel | 110 mesh or smaller | 32 |
| Apatite | 110 mesh or smaller | 117 |
| Magnesium Ammonium Phosphate | 110 mesh or smaller | 37 |
| Coral Fossil | 0.5 mm | 30 |
| Bone Black | 110 mesh or smaller | 123 |

EXAMPLE 3

A glass column was filled successively with 1 g of glass beads to which 100 μg of $^{13}C_6$-pentachlorophenol were attached, 1 g of an adsorbent which was impregnated with 50 mg of NaOH and 1 g of stoker flyash subjected to acid washing and Soxhlet extraction treatment, with sheets of glass wool being interposed between the adjacent two materials. The resulting column was heated at 300° C. for 20 minutes while air was blown at a flow rate of 5 ml/min. The dioxins so formed were collected in a similar manner to Example 1, followed by determination by GC-MS. As adsorbents, activated carbon, volcanic ash, zeolite, silica gel, apatite, coral fossil, granulated magnesium ammonium phosphate and bone black were employed. As a result, as shown in Table 3, the amount of $^{13}$C-dioxin so formed was decreased to 0%–29% of that formed without the adsorbent.

TABLE 3

Dioxin Formation Preventative Effects Of Adsorbent Impregnated With Sodium Hydroxide

| Adsorbent | $^{13}$C-dioxin Formed (ng) |
|---|---|
| None | 251 |
| Activated Charcoal | 0 |
| Volcanic Ash | 6 |
| Zeolite | 10 |
| Silica Gel | 0 |
| Apatite | 65 |
| Magnesium Ammonium Phosphate | 0 |
| Coral Fossil | 3 |
| Bone Black | 74 |

EXAMPLE 4

A glass column was filled successively with 1 g of glass beads to which 100 μg of $^{13}$C$_6$-pentachlorophenol were attached, 1 g of an adsorbent which was impregnated with 50 mg of NaOH, KOH, Ca(OH)$_2$, or NH$_3$ (aqueous ammonia), and 1 g of stoker flyash subjected to acid washing and Soxhlet extraction treatment, with sheets of glass wool being interposed the adjacent two materials. The resulting column was heated at 300° C. for 20 minutes while air was blown at a flow rate of 5 ml/min. The dioxins so formed were collected in a similar manner to Example 1, followed by determination by GC-MS.

As adsorbents, activated carbon, silica gel, apatite, coral fossil and granulated magnesium ammonium phosphate were employed. As a result, as shown in Table 4, when the adsorbent impregnated with NaOH, KOH, Ca(OH)$_2$, or NH$_3$, was used, the amount of $^{13}$C-dioxin so formed was decreased to 0%–26%, 0%–29%, 2%–33% or 2%–32% of that formed without the adsorbent, respectively.

TABLE 4

| | | Alkali | | | | |
|---|---|---|---|---|---|---|
| | | None | NaOH | KOH | Ca(OH)$_2$ | NH$_3$ |
| Adsorbent | None | 251 ng | — | — | — | — |
| | Activated Carbon | 43 | 0 | 2 | 11 | 4 |
| | Apatite | 117 | 65 | 74 | 82 | 80 |
| | Silica Gel | 32 | 0 | 0 | 6 | 5 |
| | Coral Fossil | 3 | 30 | 18 | 35 | 21 |
| | Magnesium Ammonium Phosphate | 37 | 0 | 4 | 10 | 12 |

EXAMPLE 5

A glass column was filled successively with 1 g of glass beads to which 100 μg of $^{13}$C$_6$-pentachlorophenol were attached, 1 g of an adsorbent and 1 g of stoker flyash subjected to acid washing and Soxhlet extraction, thereafter impregnated with 20 mg of covering agent. The flyash used in this experiment was different from those in experiment 1–4. Sheets of glass wool was interposed the adjacent two materials. The resulting column was heated at 300° C. for 10 minutes while air was blown at a flow rate of 5 ml/min. The dioxins so for med were collected in a similar manner to Example 1, followed by determination by GC-MS. As adsorbents, apatite and silicate were employed, and as covering agent, potassium silicate was employed.

As a result, as shown in Table 5, when adsorbents were used, the amount of $^{13}$C-dioxin so formed was decreased to 14.2%–25.4% of that formed without the adsorbent. Moreover, when both adsorbents and covering agents were used, the amount of $^{13}$C-dioxin so formed was decreased to 0%–0.2% of that formed without the adsorbents and agents.

TABLE 5

| | | Covering Agent | |
|---|---|---|---|
| | | None | Potassium Silicate |
| Adsorbent | None | 1045 ng | — |
| | Apatite | 266 | 0 ng |
| | Zeolite | 148 | 2.1 |

Many other variations and modifications of the invention will be apparent to those skilled in the art without departing from the spirit and scope of the invention. The above-described embodiments and examples are, therefore, intended to be merely exemplary, and all such variations and modifications are intended to be included within the scope of the invention as defined in the appended claims.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

Although only a single or few exemplary embodiments of this invention have been described in detail above, those skilled in the art will readily appreciate that many modifications are possible in the exemplary embodiment (s) without materially departing from the novel teachings and advantages of this invention. Accordingly, all such modifications are intended to be included within the scope of this invention as defined in the following claims, In the claims, means-plus-function clauses are intended to cover the structures described herein as performing the recited function and not only structural equivalents but also equivalent structures, This although a nail and screw may not be structural equivalents in that a nail relies entirely on friction between a wooden part and a cylindrical surface whereas a screw's helical surface positively engages the wooden part in the environment of fastening wooden parts, a nail and a screw may be equivalent structures.

What is claimed is:

1. A method for preventing the formation of dioxins in an incinerator that incinerates chlorine-containing waste, said method comprising:

impregnating an adsorbent for chlorinated aromatic hydrocarbon precursors of dioxins with an alkaline substance, thereby creating an alkaline substance-impregnated adsorbent; and contacting said alkaline substance-impregnated adsorbent with a volume of exhaust gas generated by said incinerator, at a temperature above 400° C., thereby removing said chlorinated aromatic hydrocarbon precursors of dioxins from said exhaust gas at a time before said chlorinated aromatic hydrocarbon precursors are converted to dioxins.

2. A method for preventing the formation of dioxins in an incinerator as claimed in claim 1, wherein said temperature is between 400° C. to 1000° C.

3. A method for preventing the formation of dioxins in an incinerator as claimed in claim 1, wherein said adsorbent is at least one member selected from the group consisting of an activated carbon, a volcanic ash, a silica-based material, a clay mineral, a phosphoric acid compound, and a carbonic-acid-based compound.

4. A method for preventing the formation of dioxins in an incinerator as claimed in claim 1, wherein said adsorbent is at least one member selected from the group consisting of coal based activated carbon, coconut based activated carbon, resin based activated carbon, wood based activated carbon, and peat based activated carbon.

5. A method for preventing the formation of dioxins in an incinerator as claimed in claim 1, wherein said adsorbent is a silica-based material selected from the group consisting of silica gel, Shirasu, and silica gel beads.

6. A method for preventing the formation of dioxins in an incinerator as claimed in claim 1, wherein said adsorbent is zeolite.

7. A method for preventing the formation of dioxins in an incinerator as claimed in claim 1, wherein said adsorbent is granulated ammonium magnesium phosphate.

8. A method for preventing the formation of dioxins in an incinerator as claimed in claim 1, wherein said adsorbent is a member selected from the group consisting of coral fossil and calcium carbonate.

9. A method for preventing the formation of dioxin in an incinerator as claimed in claim 1, wherein said adsorbent is porous and has an average particle size of from 100 mesh to 500 mesh.

10. A method for preventing the formation of dioxin in an incinerator as claimed in claim 1, wherein said alkaline substance is a member selected from the group consisting of NaOH, KOH, $Ca(OH)_2$, and $NH_3$.

11. A method for preventing the formation of dioxin in an incinerator as claimed in claim 1, wherein said incinerator is a member selected from the group consisting of a municipal waste incinerator, an industrial waste incinerator, a medical waste incinerator, and a burned ash fusion furnace.

12. A method for preventing the formation of dioxin in an incinerator as claimed in claim 1, further comprising a prior step of adding a covering agent for flyash, into a second volume of exhaust gas, before said step of adding said adsorbent, said covering agent being effective to coat said flyash and inhibit sorbtion of dioxin precursors by said flyash.

13. A method for preventing the formation of dioxin in an incinerator as claimed in claim 12, wherein said covering agent is an aqueous solution of a member selected from the group consisting of a water-soluble silicate, a silicone-based polymer, an ammonia and phosphoric acid compound, an organic compound, an inorganic compound, and a water-soluble colorant.

14. A method for preventing the formation of dioxin in an incinerator as claimed in claim 12, wherein said covering agent is an aqueous suspension of a member selected from the group consisting of a water-soluble silicate, a silicone-based polymer, an ammonia and phosphoric acid compound, an organic compound, an inorganic compound, and a water-soluble colorant.

15. A method for preventing the formation of dioxin in an incinerator as claimed in claim 12, wherein said covering agent is selected from the group consisting of an aqueous solution of potassium silicate, an aqueous solution of sodium silicate, an aqueous suspension of potassium silicate, and an aqueous suspension of sodium silicate.

16. A method for preventing the formation of dioxin in an incinerator as claimed in claim 12, wherein said second volume has a temperature between 500° C. and 800° C.

* * * * *